United States Patent [19]
Shirai et al.

[11] Patent Number: 5,811,489
[45] Date of Patent: Sep. 22, 1998

[54] COATING RESIN COMPOSITION BASED ON A GRAFT COPOLYMERIZED RESIN AND METHOD OF PRODUCING THE SAME

[75] Inventors: Takayuki Shirai; Takaaki Ueda; Keiji Urata, all of Iwakuni, Japan

[73] Assignee: Nippon Paper Industries Co., Ltd., Tokyo, Japan

[21] Appl. No.: 615,174

[22] PCT Filed: Jul. 26, 1995

[86] PCT No.: PCT/JP95/01483

§ 371 Date: Apr. 2, 1996

§ 102(e) Date: Apr. 2, 1996

[87] PCT Pub. No.: WO96/04344

PCT Pub. Date: Feb. 15, 1996

[30] Foreign Application Priority Data

Aug. 4, 1994 [JP] Japan .................................... 6-202748

[51] Int. Cl.$^6$ .......................... C08L 51/06; C09D 151/06
[52] U.S. Cl. ................................. 525/66; 525/74; 525/78
[58] Field of Search ................... 525/74, 78, 66

[56] References Cited

PUBLICATIONS

Database WPI, Derwent Publications, AN–94–164198 [20], JP–06–108004, Jul. 5, 1994.
Database WPI, Derwent Publications, AN–93–357360 [45], JP–05–263038, Dec. 20, 1993.
Database WPI, Derwent Publications, AN–93–278443 [35], JP–05–194910, Nov. 19, 1993.
Database WPI, Derwent Publications, AN–93–061815 [08], JP–05–009428, Nov. 19, 1993.
Database WPI, Derwent Publications, AN–92–060154 [08], JP–04–004272, Oct. 6, 1993.
Database WPI, Derwent Publications, AN–90–189779 [25], JP–02–124986, Sep. 28, 1993.
Database WPI, Derwent Publications, AN–87–160480 [23], JP–62–095372, Sep. 22, 1993.
Database WPI, Derwent Publications, AN–87–062088 [09], JP–62–018434, Sep. 22, 1993.
Database WPI, Derwent Publications, AN–84–072541 [12], JP–59–027968, Sep. 25, 1993.
Database WPI, Derwent Publications, AN–55072K [23], JP–58–071966, Sep. 25, 1993.
Database WPI, Derwent Publications, AN–86–294579 [45], JP–61–215666, Sep. 22, 1993.

*Primary Examiner*—Donald R. Wilson
*Attorney, Agent, or Firm*—Oblon, Spivak, McClelland, Maier & Neustadt, P.C.

[57] ABSTRACT

A coating resin composition, comprising a graft copolymerized resin prepared by graft polymerizing a monomer containing ethylenic unsaturated bond and a monomer containing an ethylenic unsaturated bond and a hydroxyl group, wherein the hydroxyl group content of the monomer is such that the hydroxyl group content of the graft copolymerized resin is 0.1 to 5 wt. %, onto a mixed resin of (i) a carboxyl group containing chlorinated polyolefin resin containing from 1 to 10 wt. % of $\alpha,\beta$-unsaturated carboxylic acid (anhydride) and having a chlorine content of 5 to 50 wt. %, the resin (i) being prepared by a graft polymerizing $\alpha,\beta$-unsaturated carboxylic acid (anhydride) onto a polyolefin followed by chlorination, and (ii) an oxidized chlorinated polyolefin resin containing from 5 to 50 wt. % chlorine and having a functional group index of at least 1, prepared by oxidizing and chlorinating a polyolefin, wherein the oxidizing agent for the oxidation is at least one member selected from the group consisting of air, oxygen and ozone, the weight percent ratio of resin (i) to resin (ii) ranging from 5:95 to 95:5 and wherein the mixed resins (i) and (ii) constitute from 5 to 90 wt. % of the components of the composition; and an isocyanate or alkyl-etherified amino resin as a curing agent.

7 Claims, No Drawings

COATING RESIN COMPOSITION BASED ON A GRAFT COPOLYMERIZED RESIN AND METHOD OF PRODUCING THE SAME

BACKGROUND OF THE INVENTION

1. Field of the Invention

The present invention relates to a coating composition used for the purpose of protection and beautifying various plastics and to a method of producing the same. In more detail, it relates to a resin composition for paint and adhesive, which shows excellent physical properties for film, sheet or moldings of various synthetic resins such as polyolefin resins, polyurethane resins, polyamide resins, acrylic resins and polyester resins.

2. Description of the Background

Plastics have many advantages such as high producibility, wide freedom of design, light weight, rust resistance and shock resistance, hence they are used widely as materials for parts of automobiles, electrical parts, building materials, and the like. Above all, since polyolefinic resins are low in cost and have many excellent properties such as moldability, chemical resistance, heat resistance, water resistance and good electrical characteristics, the resins are used extensively as industrial materials and are one of the materials that growth in demand is most expected in future. Different from synthetic resins which have polarity such as polyurethane resins, polyamide resins, acrylic resins and polyester resins, however, polyolefinic resins have the drawbacks of being difficult to paint and adhesion because of nonpolarity and crystallinity.

For this reason, the surfaces of polyolefinic resin moldings have been activated by plasma treatment or gas flame treatment in order to improve adherence, but this method has the drawback that the process is complicated, and is accompanied by a great deal of equipment cost and time loss. Moreover, the effect of surface treatment fluctuates due to the complexity in the shape of moldings and the influence of pigment and additives in resin, and the like.

In a method of painting without employing such a pretreatment, various primer compositions are used as can be seen in the painting of polypropylene bumpers of automobiles. However, these methods are encumbered with the troublesomeness of two-coat finishings.

As coating compositions for one-coat finishing, use has been made of chlorinated polyolefin, cyclized rubber, etc. that have strong adherent force to polyolefinic resins, but they exhibit poor weather resistance, moisture resistance, gasoline resistance, etc., resulting in insufficient performance of coated films. For this reason, attempts have been made to admix acrylic resin or alkyd resin having good physical properties as a paint for use. However, since acrylic resins or alkyd resins have poor compatibility inherently with chlorinated polyolefins, problems arise of decreased gloss of coated film, remarkably injured appearance, etc.

For improving these drawbacks, a coating composition prepared by copolymerizing acrylic monomer with chlorinated polyolefin is proposed in Japanese Unexamined Patent Publication No. Sho 58-71966. A paint composition having chlorinated polyolefin-modified hydroxyl group-containing acrylic copolymer copolymerized hydroxyl group-containing acrylic monomer or the like with chlorinated polyolefin and an isocyanate compound as essential components is proposed in Japanese Unexamined Patent Publication No. Sho 59-27968. An adhesive resin composition having hydroxyl group-containing acrylic-modified chlorinated polyolefin copolymerized hydroxyl group-containing acrylic monomer or the like in the presence of chlorinated polyolefin and liquid rubber and isocyanate compound as major components is proposed in Japanese Unexamined Patent Publication No. Sho 62-95372. Further compositions containing copolymer copolymerized chlorinated polyolefin with long-chain hydroxyl group-containing vinyl monomer, unsaturated carboxylic acid, unsaturated polyester resin or the like, isocyanate compound, ultraviolet absorber and antioxidant are proposed in Japanese Unexamined Patent Publication Nos. Hei 5-9428 and Hei 5-194910. However, chlorinated polyolefin has very poor reactivity with copolymerizable monomers or resins aforementioned. Hence, when copolymerizing with these formulations milky turbidity and two-layer separation may occur, resulting in no uniform and transparent solution that cannot become a good binder resin for paint, primer, adhesive, etc.

The inventors already proposed methods of preparing uniform and transparent binder resins in Japanese Unexamined Patent Publication Nos. Hei 5-263038 and Hei 6-108004. In one method, after graft copolymerizing chlorinated polyolefin with hydroxyl group-containing monomer, the copolymer is reacted with organic diisocyanate and high-molecular polyol. In another method chlorinated polyolefin is provided with an oxidation treatment with air, oxygen, ozone or the like during the chlorination of a polyolefin and urethanated with an organic diisocyanate and a high-molecular polyol, followed by grafting with acrylic monomer. While these methods are excellent as methods of obtaining a uniform and transparent binder resin, however, they have the drawback of poor adherence to polyolefins and upper-coating paints.

The invention has solved the problems as described above by reacting a mixture of chlorinated polyolefins modified by different methods with copolymerizable monomers, and is directed to providing a binder resin for paint, primer, adhesive, etc. which is improved over conventional modified products of chlorinated polyolefins.

SUMMARY OF THE INVENTION

A coating resin composition comprises a graft copolymerized resin prepared by graft copolymerizing a monomer containing an ethylenic unsaturated bond and a monomer containing ethylenic unsaturated bond and a hydroxyl group onto a mixed resin of (i) a carboxyl group-containing chlorinated polyolefin resin obtained by graft copolymerizing an α,β-unsaturated carboxylic acid (anhydride) onto a polyolefin followed by chlorination and (ii) a chlorinated polyolefin resin obtained by simultaneously oxidizing and chlorinating a polyolefin using at least one oxidizing agent selected from air, oxygen and ozone, an isocyanate compound or an alkyl-etherified amino resin as a curing agent.

The carboxyl group-containing chlorinated polyolefin resin of the resin composition of the invention can be obtained in such a way that a polyolefinic resin, for example, crystalline polypropylene, amorphous polypropylene, polybutene-1, polypentane-1, 4-methylpentene-1, low-density or high-density polyethylene or ethylene-propylene copolymer is thermally molten solely or in combination of two or more of such resins, or, if need be, a polyolefin with viscosity reduced by thermal decomposition is melted and graft copolymerized batchwise or continuously with an α,β-unsaturated carboxylic acid and/or its anhydride in the presence of a radical-generating agent. This material is then dispersed or dissolved into a medium such as water, carbon tetrachloride or chloroform and reacted with chlorine gas blowing-in within a temperature range from 50° to 120° C. under a pressure or ambient pressure in the presence of a radical-generating catalyst or by irradiation with ultraviolet rays.

The radical-generating agents to be used for the graft copolymerization reaction include, for example, peroxides such as di-tert-butyl peroxide, tert-butyl hydroperoxide, dicumyl peroxide, benzoyl peroxide, tert-butyl peroxide benzoate, methyl ethyl ketone peroxide and di-tert-butyl diperphthalate, and azonitriles such as azobisisobutyronitrile. Moreover, α,β-unsaturated carboxylic acids and their anhydrides to be used for the graft copolymerization reaction include, for example, acrylic acid, methacrylic acid, maleic acid, maleic anhydride, citraconic acid, citraconic anhydride, fumaric acid, mesaconic acid, itaconic acid, itaconic anhydride, aconitic acid and aconitic anhydride.

The content of α,β-unsaturated carboxylic acid and/or its anhydride in the carboxyl group-containing chlorinated polyolefin resin is preferably 1 to 10 wt. %. If the content is less than 1 wt. %, the graft reactivity with ethylenic unsaturated bond-containing monomer etc. becomes insufficient, resulting in milky turbidity or two-layer separation of the reaction liquor. If the content exceeds 10 wt. %, then gelation occurs during the grafting reaction with ethylenic unsaturated bond-containing monomer etc. or the adherence to a polyolefin becomes poor. Also, the chlorine content in the carboxyl group-containing chlorinated polyolefin resin preferably is 5 to 50 wt. %. If the chlorine content is too low, the state of the solution becomes poor and, if the chlorine content is too high, then the adherence to polyolefin becomes poor.

The oxidation treatment-provided chlorinated polyolefin resin to be used in the invention can be obtained by dispersing or dissolving a polyolefin such as crystalline polypropylene, amorphous polypropylene, polybutene-1, polypentene-1, 4-methylpentene-1, low-density or high-density polyethylene, ethylene-propylene copolymer, ethylene-propylene-diene copolymer, natural rubber or polyisoprene into a medium such as water, carbon tetrachloride or chloroform, chlorinating within a temperature range from 50° to 120° C. under pressure or ambient pressure in the presence of a radical-generating catalyst or by irradiation with ultraviolet rays, and providing with oxidation treatment by blowing-in air, oxygen or ozone concurrently, separately or alternately with gaseous chlorine beginning, from halfway or at the end of chlorination.

The progress of oxidation of the oxidation treatment-provided chlorinated polyolefin resin can be judged through increased absorption near 1730 cm$^{-1}$ measured by an infrared spectrophotometer. Also, the extent of oxidation can be identified through the functional group index determined by the following formula and, for putting the invention into practice, said functional group index preferably is 1 or larger.

$$\frac{\text{Absorbance at 1730 cm}^{-1}}{\text{Absorbance at 2970 cm}^{-1}} \times 100 = \text{Functional group index}$$

The chlorine content of oxidized chlorinated polyolefin resin preferably is within a range from 5 to 50 wt. % for use, since, if it is too low or too high, no uniform and transparent reaction liquor results after graft copolymerization reaction with ethylenic unsaturated bond-containing monomer etc.

The reacting method for the graft copolymerization of a mixture of carboxyl group-containing chlorinated polyolefin resin and oxidation treatment-provided chlorinated polyolefin resin obtained by the methods as above with the monomer containing ethylenic unsaturated bond in one molecule and the monomer containing ethylenic unsaturated bond and hydroxyl group in one molecule has a basic process in that the mixed resins of carboxyl group-containing chlorinated polyolefin resin and oxidation treatment-provide chlorinated polyolefin resin are diluted suitably with solvent, then this is warmed, and, after added polymerization initiator, the reaction is conducted while gradually adding monomers. But, the monomers may be mixed beforehand and, after added polymerization initiator, the content may be warmed to react.

The mixing ratio by weight of carboxyl group-containing chlorinated polyolefin resin to oxidation treatment-provided chlorinated polyolefin resin preferably is 5:95 to 95:5 for graft polymerization. If the carboxyl group-containing chlorinated polyolefin resin is too little, then the adherence to upper coated paint is poor when used as a primer, and, if the carboxyl group-containing chlorinated polyolefin resin is too much, then increased viscosity or gelation sometimes occurs during the graft copolymerization reaction, which is not desired. On the other hand, if the amount of oxidation treatment-provided chlorinated polyolefin resin is too small, then the reaction liquor becomes opaque or separates into two layers, resulting in a coated film, which is not glossy, and, if the amount of oxidation treatment-provided chlorinated polyolefin resin is too great, then the adherence to upper coated paint is poor, which is not desired.

The solvents to be used for reaction preferably are aromatic solvents such as toluene and xylene, and, besides, ester solvents such as ethyl acetate and butyl acetate, ketone solvents such as methyl ethyl ketone and methyl isobutyl ketone, alcohol solvents such as ethanol, isopropanol and n-butanol, aliphatic solvents, alicyclic solvents, etc. may be used safely in combination. The polymerization initiators include peroxides such as benzoyl peroxide and di-tert-butyl peroxide and azonitriles such as azobisisobutyronitrile.

The monomers containing at least one ethylenic unsaturated bond to be used in the invention include, for example, (meth)acrylic acid, methyl include, for example, (meth) acrylic acid, methyl (meth)acrylate, ethyl (meth)acrylate, n-butyl (meth)acrylate, 2-ethylhexyl (meth)acrylate, cyclohexyl (meth)acrylate, lauryl (meth)acrylate, glycidyl (meth) acrylate, styrene, vinyl acetate and (meth)acrylonitrile, and compounds such as macromonomer having polymerizable (meth)acryloyl group at the end of polystyrene and poly (meth)acrylate can also be used.

The monomers containing at least one ethylenic unsaturated bond and at least one hydroxyl group to be used in the invention include, for example, 2-hydroxyethyl (meth) acrylate, 2-hydroxypropyl (meth)acrylate and 2-hydroxybutyl (meth)acrylate, and (poly)caprolactone-modified (meth)acrylates esterified said hydroxyl group-containing (meth)acrylate with caprolactones (e.g. trade name Praccel FA, Praccel FM series, etc. from Daicel chemical Industries) can also be used. Moreover, esters obtainable by reacting α,β-unsaturated carboxylic acid or its anhydride with diols and 1,4-butene glycol, allyl alcohol, etc. can be used, if they are monomers or compounds which have an ethylenic unsaturated bond and a hydroxyl group. The amount of hydroxyl group introduced by said monomer preferably is 0.1 to 5 wt. % in the graft copolymerized resin. If less than 0.1 wt. %, the reaction liquor becomes milky turbid and separates into two layers, resulting in a non-uniform and transparent solution, despite graft copolymerization. If over 5 wt. %, then there is a possibility of gelation during graft copolymerization and adherence to a polyolefin also becomes poor.

The content of the mixture of carboxyl group-containing chlorinated polyolefin resin and oxidation treatment-provided chlorinated polyolefin resin in the graft copolymerized resin preferably is 5 to 90 wt. %. If less than 5 wt. %, the adherence to polyolefin is poor, and, if over 90 wt. %, then the balance of physical properties of coated film is aggravated.

With the graft copolymerized resin of the invention, the physical properties such as gasoline resistance, weather resistance and moisture resistance, that are needed for paint and adhesive, can be enhanced by formulating an isocyanate compound or an alkyl-etherified amino resin as a curing agent. Suitable isocyanate compounds include aromatic, aliphatic and alicyclic organic diisocyanates, for example, tolylenediisocyanate, xylenediisocyanate, 1,5-naphthalenediisocyanate, 1,4-tetramethylenediisocyanate, 1,6-hexamethylenediisocyanate, 2,2,4-trimethylhexamethylenediisocyanate, isophoronediisocyanate, 4,4-dichclohexylmethanediisocyanate and 1,4-cyclohexyldiisocyanate. Moreover, these organic diisocyanates may be modified to isocyanate derivatives such as the biuret form, the isocyanurate form and the trimethylolpropane adduct form for use.

Furthermore, isocyanate compounds blocked with a blocking agent can also be used. The blocking agents include, for example, oximes such as methyl ethyl ketoxime, cyclohexanone oxime, formaldoxime and acetaldoxime, phenols such as phenol and cresol, alcohols such as methanol, benzyl alcohol and ethylene glycol monomethyl ether, active methylene compounds such as methyl acetoacetate or acetic amide and, besides, imides, amines, imidazoles, ureas, carbamates, imines, mercaptans, sulfites and lactams.

Also, urethane resins having free isocyanate groups obtainable by reacting high-molecular polyols such as polyether polyol and polyester polyol with said organic diisocyanates, and others can be used, if they are compounds having two or more isocyanate groups per molecule.

For the purpose of promoting the reactivity and deblocking reactivity between the graft copolymerized resin of the invention and the isocyanate compound being a curing agent, a reaction catalyst can be used. As the reaction catalysts, for example, dibutyl tin dilaurate, dibutyl tin fatty acid salt, dibutyl tin diacetate, tetra-n-butyl-1,3-diacetoxydistannoxane, 3-dilauryloxydistannoxane, di-n-butyl tin oxide, mono-n-butyl tin oxide, stannous octylate and zinc octenate are exemplified.

The alkyl-etherified amino resins to be used as a curing agent in the invention are obtained by reacting an amino compound such as urea, melamine or benzoguanamine with formaldehyde for methylolation and then etherification with a lower alcohol such as methanol or butanol, and, for example, n-butyl-etherified urea resin, isobutyl-etherified urea resin, methyl-etherified melamine resin and n-butyl-etherified benzoguanamine resin belong thereto. Moreover, for promoting the reaction between the graft copolymerized resin and the alkyl-etherified amino resin, acidic catalyst can be used. For example, there are alcohol solution of hydrochloric acid, salt of strong acid like ammonium chloride, phosphoric ester like monobutyl phosphate and organic sulfonate like p-toluenesulfonic acid.

The coating composition of the invention may be used by coating as it is, but pigment, solvent and other additives, for example, ultraviolet absorber, antioxidant and pigment sedimentation-preventing agent can be added and kneaded and dispersed for use as a paint. Further, it can also be used as a primer for adhering or painting polypropylenix resin and various plastics.

Moreover, while said coating composition exhibits balanced physical properties by itself, but, if need be, alkyd resin, acrylic resin, polyacrylic polyol, polyester resin, polyester polyol, polyether resin, polyether polyol, polyurethane resin, chlorinated polyolefin, etc. may further be added safely for use.

The features of the invention lie in that the mixed resins of carboxyl group-containing chlorinated polyolefin resin and oxidation treatment-provided chlorinated polyolefin resin have graft copolymerized there to a monomer containing an ethylenic unsaturated bond and a monomer containing an ethylenic unsaturated bond and a hydroxyl group, thereby improving the reactivity between chlorinated polyolefin having substantially poor reactivity and said monomers to obtain a uniform and transparent reaction liquor, and, at the same time, obtaining a coating composition which exhibits good adherence also to polyolefins that to which it has been difficult traditionally for such resin compositions to adhere.

Here, the polymers of the monomers are components which introduce hydroxyl groups. They offer a crosslinking reaction with an isocyanate compound or an alkyl-etherified amino resin, as well as indispensable components to form the skeleton of graft copolymerized resin. Moreover, it is believed that the carboxyl group-containing chlorinated polyolefin resin also forms the skeleton of a graft copolymerized resin, but it is a component mainly to afford the adherence to polyolefin, and the oxidation treatment-provided chlorinated polyolefin resin works as a compatibilizer to improve the compatibility between the polymers of said monomers and the carboxyl group-containing chlorinated polyolefin resin.

Namely, it is considered that, by reacting said monomers, carboxyl group-containing chlorinated polyolefin resin and oxidation treatment-provided chlorinated polyolefin resin, the carboxyl group of carboxyl group-containing chlorinated polyolefin resin and the monomer containing hydroxyl group give rise to the esterifying reaction and the graft copolymerization progresses making this place as a reaction site. On the other hand, the oxidation treatment-provided chlorinated polyolefin resin has functional groups introduced there into by subjecting the polyolefin to an oxidation treatment with air, oxygen, ozone, etc. during chlorination of the polyolefin. Although these functional groups are not clear, the formation of carbonyl group, carboxyl group, acid chloride group, peroxide group, peroxide chloride group, etc. is conceivable. Moreover, the functional groups are considered to be formed at the time of a scission reaction of the polyolefin, hence these functional groups are assumed to be introduced to the end of chlorinated polyolefin molecules. This functional group and the monomer containing hydroxyl group are assumed to similarly give rise to the esterifying reaction to progress the graft copolymerization, making this place as a reaction site, but, it is considered that, different from the reaction product aforementioned between carboxyl group-containing chlorinated polyolefin resin and monomer containing hydroxyl group, the reaction product does not become a network high-molecule but becomes linear high-molecule with good solubility, because of the functional group existing at the end of molecule.

From the considerations as above, it is considered that, by reacting said monomers, carboxyl group-containing chlorinated polyolefin resin and oxidation treatment-provided chlorinated polyolefin resin, polymers of three components, i.e. polymers of monomers, graft copolymers of carboxyl group-containing chlorinated polyolefin resin with monomers, graft copolymers of oxidation treatment-provided chlorinated polyolefin resin with monomers, etc. are formed in the mixed state, and, particularly, the graft copolymers of oxidation treatment-provided chlorinated polyolefin resin with monomers being linear high-molecules with good solubility become compatibilizers between other polymers of monomers and graft copolymers of carboxyl group-containing chlorinated polyolefin resin with monomers, making it possible to obtain exceptionally uniform, transparent and balanced graft copolymers.

Best Embodiment For Putting the Invention Into Practice

In following, the invention will be illustrated in more detail based on the examples.

(TRIAL EXAMPLE 1)

In a three-necked flask equipped with stirrer, dropping funnel and cooling pipe for refluxing monomer were placed 5 kg of isotactic polypropylene with a number average molecular weight of about 15,000, which was melted completely in an oil bath kept constantly at 180° C. After passing nitrogen inside the flask for about 10 minutes, 350 g of maleic anhydride were added over 5 minutes while stirring and then 35 g of di-tert-butyl peroxide dissolved in 50 ml of heptane were added over about 30 minutes through a constant feed pump. At this time, the system was kept at 180° C. After continuing the reaction further for about 1 hour, the unreacted maleic anhydride was removed over about 30 minutes while reducing the pressure inside the flask with an aspirator. Next, 5 kg of this product were added to a glass-lined reaction vessel and 80 liters of chloroform were added, which was dissolved completely at 110° C. under a pressure of 2.5 kg/cm². Then, while irradiating the contents with ultraviolet rays, chlorine gas was passed into the flask to conduct the chlorination reaction. After completion of the reaction, solvent chloroform was distilled off with an evaporator and substituted with toluene to obtain a toluene solution with 30% solids. The chlorine content of this carboxyl group-containing chlorinated polypropylene (hereinafter referred to as MCPP) was 25 wt. % (based on solids) and the content of maleic anhydride was 4.2 wt. % (based on solids).

(TRIAL EXAMPLE 2)

Into 80 liters of carbon tetrachloride were homogeneously dissolved 5 kg of isotactic polypropylene with a number average molecular weight of 5,000 under pressure, and, while irradiating the flask with ultraviolet rays, chlorine gas was passed therein at a temperature of 100° to 110° C. to conduct the chlorination. When the chlorine content reached about 20 wt. %, the chlorine gas was switched to a mixed gas of chlorine/air with volume ratio of about 10/90, and the chlorination was conducted gradually while conducting an oxidation treatment. Tracking the functional group index aforementioned with infrared spectrophotometer on the way of oxidation treatment, a sample with functional group index of 15.5 and chlorine content of 30.2 wt. % was drawn out, carbon tetrachloride was distilled and substituted with toluene to obtain an oxidation treatment-provided chlorinated polypropylene (hereinafter referred to as OCPP) having a nonvolatile matter of 50 wt. %.

(TRIAL EXAMPLE 3)

Under similar conditions to Trial Example 2, 5 kg of isotactic polypropylene with a number average molecular weight of 15,000 was chlorinated, and, when the chlorine content reached about 20 wt. %, a mixed gas of chlorine/oxygen in a volume ratio of about 25/75 was passed therein to conduct both the oxidation treatment and chlorination. According to the method of Trial example 2 thereafter, an oxidation treatment-provided OCPP with functional group index of 16.5, a chlorine content of 31.8 wt. % and a nonvolatile matter of 50 wt. % was obtained.

(EXAMPLE 1)

Into a flask equipped with stirrer, thermometer and cooling pipe for refluxing monomer were added 375 g of MCPP (nonvolatile matter 20 wt. %) and 175 g of toluene, and the temperature was raised to 85° C. Next, after adding 5 g of benzoyl peroxide and stirred for 30 minutes, 137 g of methyl methacrylate, 205 g of lauryl methacrylate and 58 g of 2-hydroxyethyl acrylate were added over about 3 hours and the graft copolymerization reaction was conducted further for about 7 hours to obtain a uniform and transparent reaction liquor (nonvolatile matter 50 wt. %). Following this, 80 g of reaction product thus obtained and 26 g of titanium dioxide were kneaded for 2 hours in a sand mill and then 7.8 g of isocyanate curing agent N35600 (hexamethylenediisocyanate type, isocyanurate form from Bayer Co.,) were added. After the viscosity was adjusted with xylene so as to become 13 to 15 seconds/20° C. through No. 4 Ford Cup, the material was spray painted onto a polypropylene plate TX-933A (from Mitsubishi Petrochemical Co., Ltd.). After drying for 15 minutes at room temperature, the material was forcibly dried for 30 minutes at 80° C. and allowed to stand for a week in room. The coated film was tested. Results are shown in Table 1.

(EXAMPLE 2)

In a sand mill, 80 g of uniform and transparent reaction liquor (nonvolatile matter 50 wt. %) obtained in Example 1 and 26 of titanium dioxide were kneaded for 2 hours, and then 17 g of alkyl-etherified amino resin curing agent Melane 11 (butyl-etherified urea resin, nonvolatile matter 60%, from Hitachi Chemical Co., Ltd.) and 20 g of solution of p-toluenesulfonic acid/36% hydrochloric acid/isopropanol=10/10/80 (ratio by weight) were added. After the viscosity was adjusted with xylene so as to become 13 to 15 seconds/20° C. through No. 4 Ford Cup, the material was spray painted onto a polypropylene plate TX-933A (from Mitsubishi Petrochemical Co., Ltd.). After drying for 15 minutes at room temperature, this material was forcibly dried for 30 minutes at 120° C. and allowed to stand for a week in room. Then the coated film was tested. Results are shown in Table 1.

(EXAMPLE 3)

Into a flask equipped with stirrer, thermometer and cooling pipe for refluxing monomer were thrown-in 250 of MCPP (nonvolatile matter 20 wt. %) obtained in Trial example 1, 100 g of OCPP (nonvolatile matter 50 wt. %) and 250 g of toluene, and the temperature was raised to 85° C. Next, after adding 5 g of benzoyl peroxide and stirring for 30 minutes, with a formulating proportion of 171 g of methyl methacrylate, 171 g of cyclohexyl methacrylate and 58 g of 2-hydroxyethyl acrylate, the reaction was conducted according to the method of Example 1 to obtain a uniform and transparent reaction liquor (nonvolatile matter 50 wt. %). Following this, with a formulating proportion of 80 g of reaction product thus obtained, 26 g of titanium dioxide and 14.6 g of isocyanate curing agent Desmodule Z4370 (isophoronediisocyanate type, isocyanurate form, from Bayer Co.), the paint adjustment and test of coated film were performed by the similar method to Example 1. Results are shown in Table 1.

(EXAMPLE 4)

With a formulating proportion of 80 g of uniform and transparent reaction liquor (nonvolatile matter 50 wt. %)

obtained in Example 1, 26 g of titanium dioxide, 16.3 g of isocyanate curing agent SBU-Isocyanate 0886 (block type polyisocyanate from Bayer Co.) and 0.5 g of catalyst dibutyl tin dilaurate, the paint adjustment and test of coated film were performed by the similar method to Example 2. Results are shown in Table 1.

(COMPARATIVE EXAMPLE 1)

Into a flask equipped with stirrer, thermometer and cooling pipe for refluxing monomer were adding 200 g of OCPP (nonvolatile matter 50 wt. %) obtained in Trial example 2 and 400 g of toluene, and the temperature was raised to 85° C. Next, after adding 5 g of benzoyl peroxide and stirring for 30 minutes, with a formulating proportion of 205 g of methyl methacrylate, 137 g of lauryl methacrylate and 58 g of 2-hydroxyethyl acrylate, the reaction was conducted according to the method in Example 1 to obtain a uniform and transparent reaction liquor (nonvolatile matter 50 wt. %). Further, with the similar formulating composition and recipe to Example 1, the paint adjustment and test of coated film were performed. Results are shown in Table 1.

(COMPARATIVE EXAMPLE 2)

Into a flask equipped with stirrer, thermometer and cooling pipe for refluxing monomer were thrown-in 500 g of MCPP (nonvolatile matter 20 wt. % obtained in Trial example 1 and 100 g of toluene, and the temperature was raised to 85° C. Next, after thrown-in 5 g of benzoyl peroxide and stirred for 30 minutes, with a formulating proportion of 205 g of methyl methacrylate, 137 g of lauryl methacrylate and 58 g of 2-hydroxyethyl acrylate, the reaction liquor (nonvolatile matter 50 wt. %) obtained showed milky turbidity and separated into two layers when allowing to stand stationarily for a long period. Using this reaction liquor, with the similar formulating composition and recipe to Example 1, the paint adjustment and test of coated film were performed. Results are shown in Table 1.

Testing method of coated film

Adherence

On the surface of coated film, 100 cross-cuts reaching base were made at intervals of 1 mm. Cellophane adhesive tape was adhered closely thereon and peeled off in the direction of 180° C. to judge by the extent of remaining coated film.

Accelerated weather resistance

A carbon arc type sunshine weathermeter was employed. The gloss was measured by 60° C. mirror reflection and the brightness with Hunter.

Moisture resistance

Allowing to stand for 240 hours in an atmosphere of 50° C. and relative humidity of 98%, the state of coated film and the adherence were examined.

Warm water resistance

The painted plate was dipped into warm water of 40° C. for 120 hours or 240 hours and the state of coated film and the adherence were examined.

Gasoline resistance

A scratch (X mark) reaching base was engraved on the surface of coated film and the painted plate was dipped into gasoline for 1 hour to examine the state of coated film.

Possibility of Utilization in the Industry (From the Results of Table 1)

It can be seen that the reaction liquors graft coplymerized the mixture of carboxyl group-containing chlorinated polypropylene and oxidation treatment-provided chlorinated polypropylene with acrylic monomers are uniform and transparent, and further the coated films formulated with polyisocyanate or alkyl-etherified amino resin as a curing agent give very balanced coated films without injuring the adherence, appearance, gasoline resistance, weather resistance, moisture resistance, warm water resistance, etc. On the other hand, in Comparative example 1 wherein

TABLE 1

|  | Example 1 | Example 2 | Example 3 | Example 3 | Comparative example 1 | Comparative example 2 |
|---|---|---|---|---|---|---|
| Adherence | ⊚ | ⊚ | ⊚ | ⊚ | ○ | ⊚ |
| Accelerated weather resistance |  |  |  |  |  |  |
| Gloss % |  |  |  |  |  |  |
| 0 hour | 91 | 92 | 92 | 90 | 89 | 71 |
| 200 hour | 90 | 89 | 92 | 90 | 78 | 68 |
| 500 hour | 88 | 87 | 91 | 88 | 70 | 63 |
| 1000 hour | 86 | 85 | 88 | 87 | 65 | 53 |
| Brightness % |  |  |  |  |  |  |
| 0 hour | 86 | 86 | 87 | 86 | 85 | 63 |
| 200 hour | 86 | 86 | 87 | 85 | 84 | 60 |
| 500 hour | 85 | 85 | 85 | 84 | 84 | 56 |
| 1000 hour | 84 | 84 | 85 | 84 | 83 | 52 |
| Pencil hardness | HB | H | H | H | HB | HB |
| Gasoline resistance | ⊚ | ⊚ | ⊚ | ⊚ | X | ○ |
| Moisture resistnce | ⊚ | ⊚ | ⊚ | ⊚ | X | Δ |
| Warm water resistance | ⊚ | ⊚ | ⊚ | ⊚ | Δ | Δ |
| State of reaction liquor | ⊚ | ⊚ | ⊚ | ⊚ | ⊚ | XX |

Judgement criterion in table:
⊚: Good, ○: Almost good, Δ: Slightly poor, X: Poor, XX: Very poor oxidation treatment-provided chlorinated polypropylene was graft copolymerized with acrylic monomers, the reaction liquor obtained becomes uniform and transparent, but the physical properties of coated film are poor. Also, in Comparative example 2 wherein carboxyl group-containing chlorinated polypropylene was graft copolymerized with acrylic monomers, the reaction liquor obtained gives rise to milky turbidity and two-layer separation and the physical properties of coated film are insufficient. From the results above, it is seen that the inventive coating compositions are very excellent.

We claim:

1. A coating resin composition, comprising:

(A) a graft copolymerized resin prepared by graft polymerizing a monomer containing an ethylenic unsaturated bond and a monomer containing an ethylenic unsaturated bond and a hydroxyl group, onto a mixed resin of (i) a carboxyl group containing chlorinated polyolefin resin containing from 1 to 10 wt. % of α,β-unsaturated carboxylic acid and/or anhydride and having a chlorine content of 5 to 50 wt. %, the resin (i) being prepared by a graft polymerizing α,β-unsaturated carboxylic acid and/or anhydride onto a polyolefin followed by chlorination, and (ii) an oxidized chlorinated polyolefin resin containing from 5 to 50 wt. % chlorine and having a functional group index of at least 1, wherein said index is 100 times the ratio of absorbance at 1730 $cm^{-1}$ to absorbance at 2970 $cm^{-1}$ prepared by oxidizing and chlorinating a polyolefin, wherein the oxidizing agent for the oxidation is at least one member selected from the group consisting of air, oxygen and ozone, the weight percent ratio of resin (i) to resin (ii) ranging from 5:95 to 95:5 and wherein the mixed resins (i) and (ii) constitute from 5 to 90 wt. % of the components of the graft polymerized resin of the composition; and (B) an isocyanate or alkyl-etherified amino resin as a curing agent.

2. The coating resin composition of claim 1, wherein the polyolefin resin of said chlorinated polyolefin resin is crystalline polypropylene, amorphous polypropylene, polybutene-1, polypentene-1, 4-methylpentene-1, low density or high-density polyethylene, ethylene-propylene copolymer, ethylene-propylene-diene copolymer, natural rubber or polyisoprene.

3. The coating resin composition of claim 1, wherein the α,β-unsaturated carboxylic acid and/or anhydride component of said carboxyl group-containing chlorinated polyolefin resin is acrylic acid, methacrylic acid, maleic acid, maleic anhydride, citraconic acid, citraconic anhydride, fumaric acid, mesaconic acid, itaconic acid, itaconic anhydride, aconitic acid or aconitic anhydride.

4. A method of producing a coating resin composition, comprising:

(a) preparing a mixed resin of (i) a carboxylic group-containing chlorinated polyolefin resin containing from 1 to 10% by weight of α,β-unsaturated carboxylic acid and/or anhydride and having a chlorine content of 5 to 50 wt. % and prepared by a graft copolymerizing an α,β-unsaturated carboxylic acid and/or anhydride onto a polyolefin followed by chlorination and (ii) a chlorinated polyolefin resin containing from 5 to 50 wt. % chlorine and having a functional group index of at least 1 wherein said index is 100 times the ratio of absorbance at 1730 $cm^{-1}$ to absorbance at 2970 $cm^{-1}$ prepared by oxidizing and chlorinating a polyolefin, wherein the oxidizing agent for the oxidation is at least one member selected from the group consisting of air, oxygen and ozone, the weight percent ratio of resin (i) to (ii) ranging from 5:95 to 95:5;

graft-copolymerizing a monomer containing an ethylenic unsaturated bond and a monomer containing an ethylenic unsaturated bond and a hydroxyl group, such that the hydroxyl group content of the graft copolymerized resin formed upon graft copolymerization ranges from 0.1 to 5 wt. %, onto said mixed resin in the presence of a polymerization initiator, thereby preparing a graft copolymerized resin; and combining an isocyanate compound or an alkyl-etherified amino resin as a curing agent with the graft copolymerized resin material, the mixed resins (i) and (ii) constituting from 5 to 90 wt. % of the components of the graft polymerized resin of the composition.

5. The method of claim 4, wherein the polyolefin resin of said chlorinated polyolefin resin is crystalline polypropylene, amorphous polypropylene, polybutene-1, polypentene-1, 4-methylpentene-1, low density or high-density polyethylene, ethylene-propylene copolymer, ethylene-propylene-diene copolymer, natural rubber or polyisoprene.

6. The method of claim 4, wherein the α, β-unsaturated carboxylic acid and/or anhydride component of said carboxyl group-containing chlorinated polyolefin resin is acrylic acid, methacrylic acid, maleic acid, maleic anhydride, citraconic acid, citraconic anhydride, fumaric acid, mesaconic acid, itaconic acid, itaconic anhydride, aconitic acid or aconitic anhydride.

7. The coating resin composition of claim 1, wherein said carboxyl group-containing chlorinated polyolefin resin is a carboxyl group-containing chlorinated polypropylene;

the oxidation treated chlorinated polyolefin resin is an oxidation treated chlorinated polypropylene;

said monomer containing an ethylenic unsaturated bond is methylmethacrylate;

said monomer containing an ethylenic unsaturated bond and a hydroxyl group is 2-hydroxyethyl acrylate; and said curing agent is the isocyanurate form of hexamethylene diisocyanate.

* * * * *